United States Patent [19]

Raizen et al.

[11] Patent Number: 4,692,742

[45] Date of Patent: Sep. 8, 1987

[54] SECURITY SYSTEM WITH CORRELATED SIGNALLING TO SELECTED SATELLITE STATIONS

[76] Inventors: David T. Raizen, 31 Meadow Rd., Scarsdale, N.Y. 10583; Richard A. Wilmot, 9 Woodlawn Ave., Albany, N.Y. 12209

[21] Appl. No.: 789,568

[22] Filed: Oct. 21, 1985

[51] Int. Cl.[4] .......................... G08B 1/08; H04Q 7/00

[52] U.S. Cl. .................................... 340/539; 340/524; 340/531; 340/534; 340/536; 379/40; 379/49; 379/51

[58] Field of Search ............... 340/524, 539, 531, 536, 340/534, 506; 455/53, 54, 33, 67; 379/37, 39, 40, 41-45, 49, 51

[56] References Cited

U.S. PATENT DOCUMENTS

| | | | |
|---|---|---|---|
| 3,925,763 | 12/1975 | Wadhwani et al. | 340/505 |
| 4,153,881 | 5/1979 | Permut et al. | 340/539 |
| 4,247,846 | 1/1981 | Zedler | 340/539 |
| 4,482,785 | 11/1984 | Finnegan et al. | 340/539 |

OTHER PUBLICATIONS

Motorola, "Alarm Initiated Input Alphanumeric Display Paging (System III); 1984.

*Primary Examiner*—Donnie L. Crosland

[57] ABSTRACT

A security system wherein a plurality of locations are monitored by sensors which transmit alarm signals to a central control station by radio or telephone, each alarm signal being encoded to identify the particular sensor location and alarm condition. The control station comprises a computer which correlates the received alarm signals with information stored in the computer memory to identify which of a plurality of satellite stations are to be notified of a particular alarm condition at a particular monitored location, what correlated information is to be transmitted to such satellite station, and whether to effect such transmission by radio or telephone. The computer actuates a radio or telephone transmitter in the control station to transmit correlated signals to the appropriate satellite stations, and may also actuate a speech synthesizer so that such signals may be transmitted as synthetic speech.

9 Claims, 3 Drawing Figures

SECURITY SYSTEM WITH CORRELATED SIGNALLING TO SELECTED SATELLITE STATIONS

BACKGROUND OF THE INVENTION

1. Field of the Invention

This invention relates to a security system for monitoring specified alarm or trouble conditions at various sensor locations, correlating the sensor information in accordance with stored instructions, and transmitting appropriate signalling information by radio or telephone to subscribers selected pursuant to such instructions. The signalling information may be in the form of a speech-synthesized message.

2. Description of the Related Art

U.S. Pat. No. 4,462,022, issued Jul. 24, 1984, to Stolarczyk, discloses an alarm system wherein a plurality of sensors at different locations transmit radio signals to a master control station, the signal from each sensor being modulated by an identifying pulse code. The master control station comprises a microprocessor which translates the code signal into an alarm signal signifying that the particular sensor is operative, and the alarm signal sounds an alarm at the master station or may be transmitted to a remote central station. However, supervisory personnel must be present at the control station or the remote central station in order to determine the source and condition of the alarm, who should be notified to take appropriate action and to give such notification to such person.

U.S. Pat. No. 4,442,426, issued Apr. 10, 1984 to Heuschmann et al., discloses an alarm system in which mobile transmitters produce coded signals identifying each transmitter. Upon reception at a receiving center the signal actuates an alarm. This system, like the previous one, necessitates the presence of supervisory personnel at the receiving center to determine the source and condition of the alarm, who to notify to take appropriate action, and to give such notification.

U.S. Pat. No. 4,257,038, issued Mar. 17, 1981 to Rounds et al., discloses a coded security system in which a plurality of sensors at monitored locations transmits pulse-coded radio frequency signals identifying particular conditions occurring at those locations. Upon detection of such coded signals at a central alarm station an alarm indication is produced which signifies to personnel thereat that such signal must be decoded to identify the particular condition at a particular location, whereby they can initiate corrective measures.

U.S. Pat. No. 4,455,511, issued June 19, 1984 to Lemelson, discloses a remote control system in which a central monitoring station which includes a microprocessor and various sensors connected thereto analyzes the signal from any sensor and produces a digitally encoded signal identifying the condition monitored thereby. This signal, in the form of coded tones, is transmitted by radio to one or more portable or statellite receivers which produce therefrom a corresponding audible alarm. Alternatively, either the microprocessor or the satellite receiver may convert the received signal to speech-synthesized form so that a person in the vicinity is verbally advised of the monitored trouble condition and location. Such a system is not adapted for monitoring a large number of remote monitored locations and conditions, and selecting which particular subscriber to notify or page concerning occurrence of a particular alarm condition at a particular location.

When there are hundreds or thousands of monitored sites and paging stations, it becomes essential that signals identifying a particular trouble condition at a particular site only be provided to the specific subscriber concerned with that condition and site. It is also essential that the information transmitted to the subscriber be correlated with information relevant to the particular trouble condition. For example, not merely that the temperature of a patient at a monitored site has risen, but whether it has reached a predetermined level. It may also be desirable to indicate whether the temperature has been trending upward or downward over the past several hours. Such correlation of the condition detected by a sensor with other information, and determination of the appropriate subscriber to be notified together with notification of such subscriber without intervention by supervisory personnel, has not heretofore been available.

SUMMARY OF THE INVENTION

A security system in accordance with the invention comprises a plurality of sensors for respectively monitoring the occurrence of predetermined alarm conditions at a plurality of sites, each sensor being connected to an encoder which encodes the alarm signal to identify the particular alarm condition and sensor location. Each encoder is connected to means such as a radio transmitter or telephone automatic dialer for transmitting the encoded alarm signal over a transmission channel. The system further comprises a central control station adapted to receive and decode the encoded alarm signals, and a plurality of satellite stations respectively adapted to receive from a radio or telephone receiving channel coded signals uniquely identifying each of such satellite stations. A computer comprised in the central control station is programmed to correlate each of the received decoded alarm signals with information stored in the computer memory relevant to each sensor location and alarm condition, and produces a correlated signal which addresses the particular satellite station to be notified. Such signal also includes the correlated information to be transmitted to such satellite station. Means such as an auto-dialer or a radio transmitter are comprised in the central control station for transmitting the correlated information signal to the selected satellite station.

BRIEF DESCRIPTION OF THE DRAWINGS

A more complete description of the invention in terms of certain preferred embodiments thereof will be given with reference to the accompanying drawings, in which.

DESCRIPTION OF THE PREFERRED EMBODIMENTS

Figure 1:
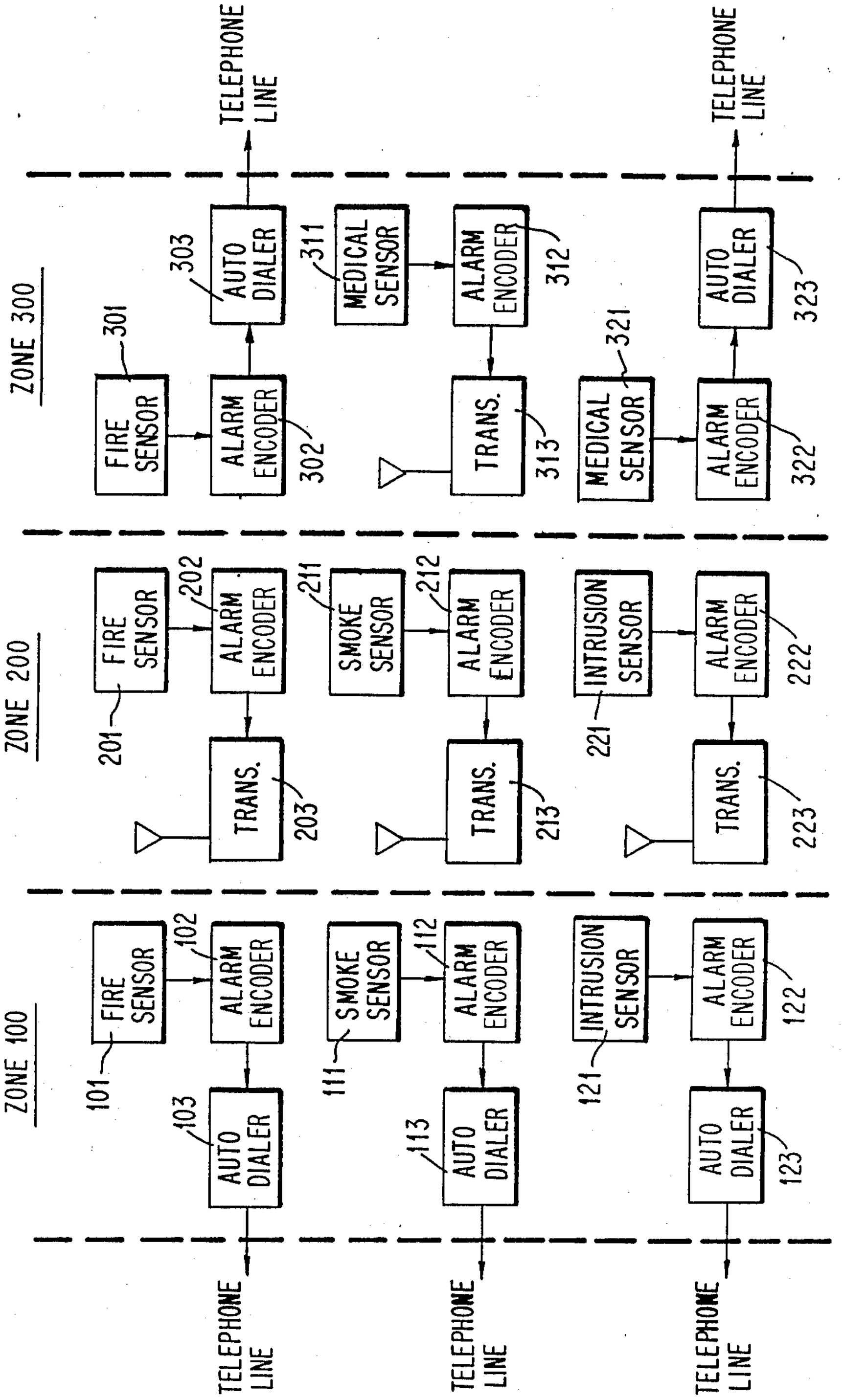
FIG. 1 is a diagram showing various monitored locations or zones in which different sensors detect different alarm conditions and encoded alarm signals identifying such conditions and locations are transmitted to a central control station by radio or telephone.

FIG. 1 shows three zones 100, 200 and 300 denoting three different locations which may be either in homes, offices, stores, hospitals, automobiles, boats, etc. which are to be monitored for various alarm conditions such as fire, smoke, intrusion or medical condition. Monitoring is effected by sensors which are sensitive to the specific condition to be detected and produce an electrical signal when so actuated. The sensors may be portable and, in the case of medical monitoring, carried on the person of the patient. Alternatively, for some monitored conditions, they may be fixed in position in proximity to a telephone line terminal. Such sensors are widely commercially available.

Zone 100 has a fire sensor 101, smoke sensor 111 and intrusion sensor 121 respectively connected to encoders responsive to the sensor signals to produce an identifying frequency shift keyed (FSK) alarm signal based, for example, on combinations of two out of one hundred tones. This is sufficient to represent 10,000 codes of 18 bits which can be assigned, for example, to uniquely identify each of 100 sensors in each of up to 100 zones. Such are commercially available, for example, from Procom, Inc. or Radionics, Inc. The FSK alarm signal will therefore identify the alarm condition and sensor location. The sensor location may actually signify the account number of a particular subscriber.

In zone 100 each alarm encoder is connected to an automatic telephone dialer connected to the public telephone line, the dialer being set to address a telephone number assigned to the central control station. Thus, in zone 100 the fire sensor 101 actuates alarm encoder 102 when fire is detected. Encoder 102 generates an FSK alarm signal which identifies zone 100 and sensor 101 therein, and which actuates automatic dialer 103 to address the control station telephone number. The dialer then forwards the FSK alarm signal over the telephone line. Zone 100 also includes a smoke sensor 111 which actuates an alarm encoder 112 connected to an automatic dialer 113, and an intrusion sensor 121 which actuates an alarm encoder 122 connected to an automatic dialer 123. Alternatively, all encoders could be connected in common to a single automatic dialer.

In zone 200 each alarm encoder is connected to a radio transmitter, all transmitters broadcasting by AM or FM in the 150 MHZ or 460 MHZ bands. Thus, fire sensor 201 actuates an alarm encoder 202 and the FSK alarm signal identifying zone 200 and sensor 201 actuates transmitter 203 to broadcast a radio frequency signal modulated by that alarm signal. The transmitter may be of relatively low power, and in cases where the central station is at an excessive distance the system may comprise radio relays in the vicinities of the various zones which receive the zone alarm signals and re-transmit them to the central control station. Zone 200 also includes a smoke sensor 211 which actuates an alarm encoder 212 connected to a radio transmitter 213; and an intrusion sensor 221 which actuates an alarm encoder 222 connected to a radio transmitter 223. Alternatively, all sensors could be connected in common to a single transmitter.

Zone 300 has a combination of telephone and radio alarm signalling. A fire sensor 301 actuates an alarm encoder 302 connected to a telephone line automatic dialer 303; a medical condition sensor 311 actuates an alarm encoder 312 connected to a radio transmitter 313; and another medical condition sensor 321 actuates an alarm encoder 322 connected to a telephone line automatic dialer 323. Of course, if a sensor is monitoring a movable site such as a car or boat or ambulatory person, radio signalling must be employed; telephone signalling only being suitable for fixed site monitoring.

Figure 2:
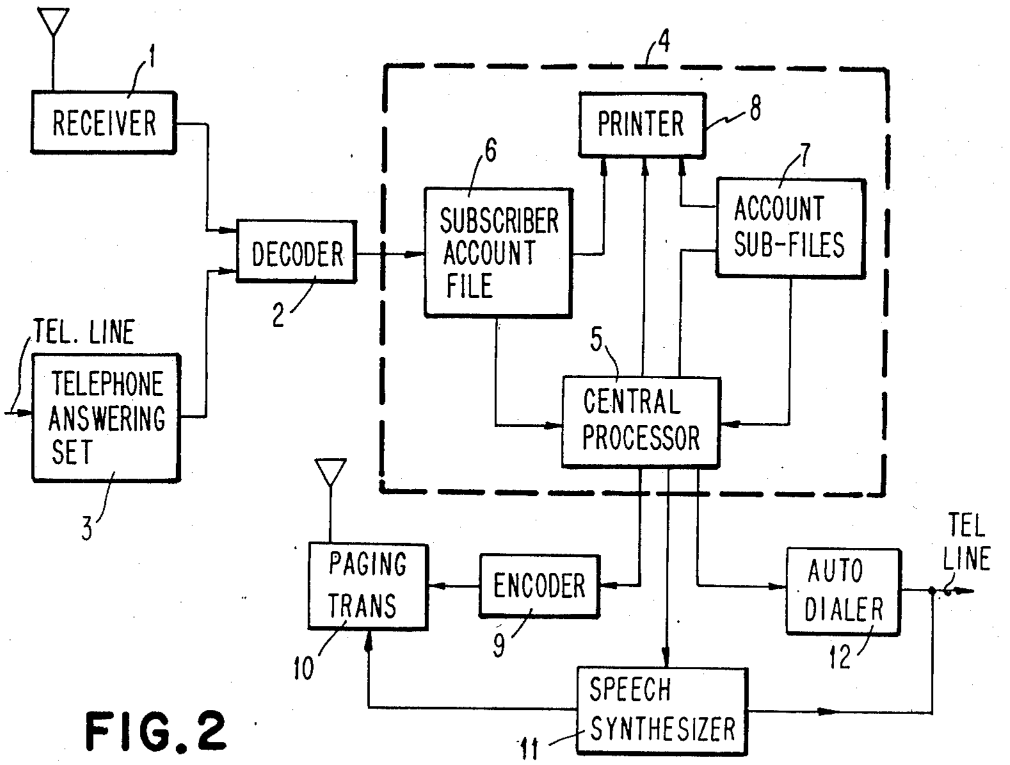
FIG. 2 is a diagram of the central control station and the computer and related equipment comprised therein for receiving and decoding the encoded alarm signals and generating correlated information for transmission to the satellite stations to be notified of particular alarm conditions.

Referring now to FIG. 2, showing the central control station arrangement, FSK alarm signals transmitted by radio from the alarm system sensors in FIG. 1 are received by a radio receiver 1 which provides them to a decoder 2 which converts the FSK alarm signal to the corresponding digitally coded alarm signal. FSK alarm signals transmitted by telephone from the alarm system sensors in FIG. 1 are received over the telephone line (which may actually be a plurality of lines with respective telephone numbers) and actuate a telephone answering set 3 to forward them to decoder 2 to recover the corresponding digitally coded alarm signal. The digital alarm signals received by radio or telephone are supplied by decoder 2 to a computer 4, such as Commodore Model 64, Apple II or IBM PC/XT. Such computer comprises a central processor 5 and various memory files and terminal equipment. For purposes of simplifying the description of the memory files, they are shown separately but may actually be in different locations in a single disc memory. A memory 6 contains a file of subscriber accounts respectively corresponding to each of the monitored locations or zones, so that the portion of a received encoded alarm signal identifying the alarm location can be correlated with the subscriber account concerned with that location. A memory 7 contains account sub-files which correlate, for each subscriber account, the received encoded alarm signal with information stored therein specifying the satellite station to be notified, what form such notification is to take (i.e., whether an audio tone signal and/or a speech-synthesized message), what information is to be communicated to the satellite station and whether transmission is to be by radio or telephone. Central processor 5 may readily be programmed to make such determinations by programming procedures and software wellknown in the art. Computer 4 may include a printer 8 which provides, under the control of processor 5, a printed record for each account file of the date and time of each sensor alarm signal and the action taken in response thereto. It may also provide, from information in the account sub-files, appropriate subscriber billing statements.

If, for example, processor 5 determines from account sub-file memory 7 that a particular satellite station is to be notified by radio of the alarm condition indicated by a particular sensor at a particular zone, it produces a digital paging signal addressing that satellite station. It then forwards the paging signal to an encoder 9 which converts it to a corresponding two sequential frequency audio tone which is forwarded to a paging radio transmitter 10 which then broadcasts that signal to all satellite stations. The audio signal will actuate only the particular satellite station addressed by those sequential audio tones. The satellite station thereby receives audio notification that an alarm condition has occurred at the monitored location. Further, if memory 7 had in its account sub-file that a speech message is to be transmitted for the particular alarm condition, processor 5 will supply digitized voice information to a speech synthesizer 11 which converts it to a speech simulating signal. Such speech synthesizers are widely commercially available; for example, the Digitalker TM supplied by National Semiconductor Corporation or Speech-talk TM supplied by Jameco Electronic Corporation, both of California. The speech simulating signal, after transmission of the audio paging tone, is conveyed to transmitter 10 for broadcasting.

In the event processor 5 determines from account subfile memory 7 that a particular satellite station is to be notified by telephone, it conveys a code signal identifying that satellite station telephone number to an automatic dialer 12 which addresses the indicated telephone number. Thereafter, processor 5 conveys the information to be transmitted, in voice encoded form, to speech synthesizer 11 which converts it to speech synthesized form and forwards it to the telephone line.

Figure 3:
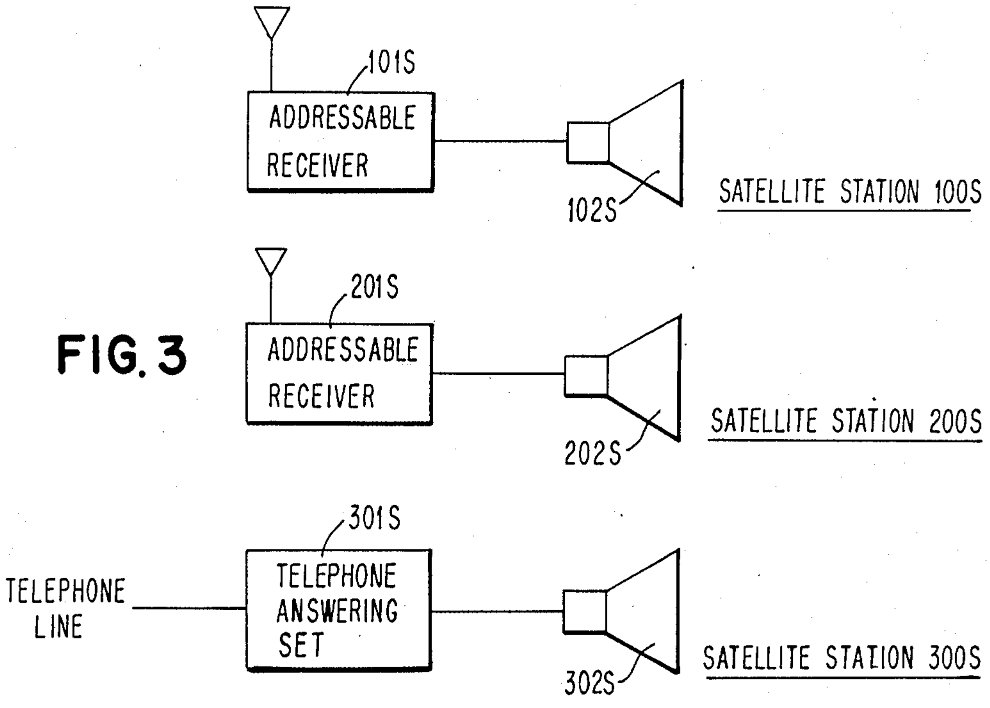
FIG. 3 is a diagram of several satellite stations for receiving the correlated information from the central control stations.

Referring now to FIG. 3, there are shown three different satellite stations 100S, 200S and 300S representing locations or persons to which the correlated information assembled by computer 4 in FIG. 2 is to be communicated concerning the alarm conditions at sensor 101 in zone 100 in FIG. 1, sensor 201 in zone 200 in FIG. 1, and sensor 311 in zone 300 in FIG. 1. In practice, there will be at least one satellite station to be notified of the alarm condition occurring at each of the sensors in FIG. 1. Satellite stations 100S and 200S each comprise addressable receivers 101S, 201S which only respond to radio signals after being actuated by the two-sequential audio frequency tone code specific to the particular satellite station, and upon being so addressed actuate loudspeakers 102S, 202S with the received tone or voice synthesized messages. Such addressable radio receivers are widely commercially available; for example, the Motorola "Spirit" Addressable Pager. Satellite station 300S comprises a telephone answering set 301S connected to the telephone network and addressed by a specific telephone number determined by computer 4 in FIG. 2. It should be noted that a radio sensor message may be correlated by computer 4 with a satellite station for either radio paging or telephone reception, depending on the instructions contained in account sub-file memory 7 for the particular account file relating to the particular alarm signal and its sensor location.

While the invention has been described with reference to certain specific embodiments thereof, it will be obvious to those skilled in the art that numerous modifications and variations thereof may be made without departing from the essential teachings and scope of the invention as set forth in the ensuing claims.

What is claimed is:

1. A security system comprising:

a plurality of sensors respectively adapted to produce an alarm signal upon occurrence of a predetermined alarm condition at a location monitored by such sensor;

a plurality of encoders respectively connected to said sensors, each encoder being responsive to the alarm signal produced by the sensor connected thereto to encode such alarm signal to identify the corresponding alarm condition and sensor location;

means connected to each of said encoders for transmitting the encoded alarm signals produced thereby over at least one transmission channel;

a plurality of satellite stations respectively adapted to receive correlated signals which uniquely address each of such satellite stations;

a central control station comprising means for receiving and decoding the transmitted encoded alarm signals from said transmission channels;

a computer further comprised in said central control station programmed to correlate each of the decoded alarm signals with information stored in the computer memory relating to each sensor location and alarm condition, and adapted to produce correlated signals which respectively address one or a plurality of particular satellite station to be notified of respective alarm conditions and include the correlated signals to be transmitted to each such satellite station and further adapted to select the number and identities of the satellite stations to be notified, which selection being a function of the nature of the alarm condition and of the location being monitored by said sensor;

and means comprised in said central control station and connected to said computer for transmitting such correlated signals to the satellite stations identified thereby.

2. A security system in accordance with claim 1, wherein:

said means comprised in said central control station for transmitting the correlated signals comprises a radio transmitter;

at least one of said satellite stations comprises a radio receiver for receiving the correlated signals addressed thereto;

and correlated signals addressed to satellite stations which comprises a radio receiver are transmitted thereto by the central control station radio transmitter.

3. A security system in accordance with claim 1, wherein:

said means comprised in said central control station means for transmitting the correlated signals comprises an automatic telephone dialer connected to the public telephone line;

at least one of said satellite stations comprises a telephone answering set connected to the public telephone line and addressable by a telephone number;

and correlated signals addressed to satellite stations which comprise a telephone answering set are transmitted to such satellite stations by the central control station automatic dialer over the public telephone line; the correlated signals which address such satellite stations comprising the telephone numbers of the telephone answering sets connected thereto.

4. A security system in accordance with any of claims 1, 2 or 3, wherein said central control station comprises a speech synthesizer controlled by said computer and to which the correlated signals produced by said computer are provided; said speech synthesizer being adapted to convert such correlated signals to synthetic speech signals which express the correlated information included therein.

5. A security system in accordance with claims 1, 2, or 3, wherein said computer comprises means for producing a printed copy of the record stored in the computer memory.

6. A security system in accordance with claim 1, wherein said computer is further programmed to retain in the computer memory a record of each received decoded alarm signal and the corresponding sensor location and alarm condition, the correlated signal produced in response thereto, and the satellite station to which such correlated signal was addressed.

7. A security system in accordance with claim 2, wherein said computer is further programmed to retain in the computer memory a record of each received decoded alarm signal and the corresponding sensor location and alarm condition, the correlated signal produced in response thereto, and the satellite station to which such correlated signal was addressed.

8. A security system in accordance with claim 3, wherein said computer is further programmed to retain in the computer memory a record of each received decoded alarm signal and the corresponding sensor location and alarm condition, the correlated signal produced in response thereto, and the satellite station to which such correlated signal was addressed.

9. A security system in accordance with any of the claims 1, 2 or 3 wherein said central control station includes means for selecting the nature and format of the signal to be transmitted to said satellite stations, said nature and format being determined by correlating the information received from the alarm sensor with information previously stored in said computer and wherein said satellite stations include means for accepting said information in the nature and format transmitted.

* * * * *